June 7, 1938.  R. HOLLAWAY  2,119,626
DIRECTION SIGNAL
Filed Dec. 19, 1933  6 Sheets-Sheet 2

Inventor
R. Hollaway
By Clarence A. O'Brien
Attorney

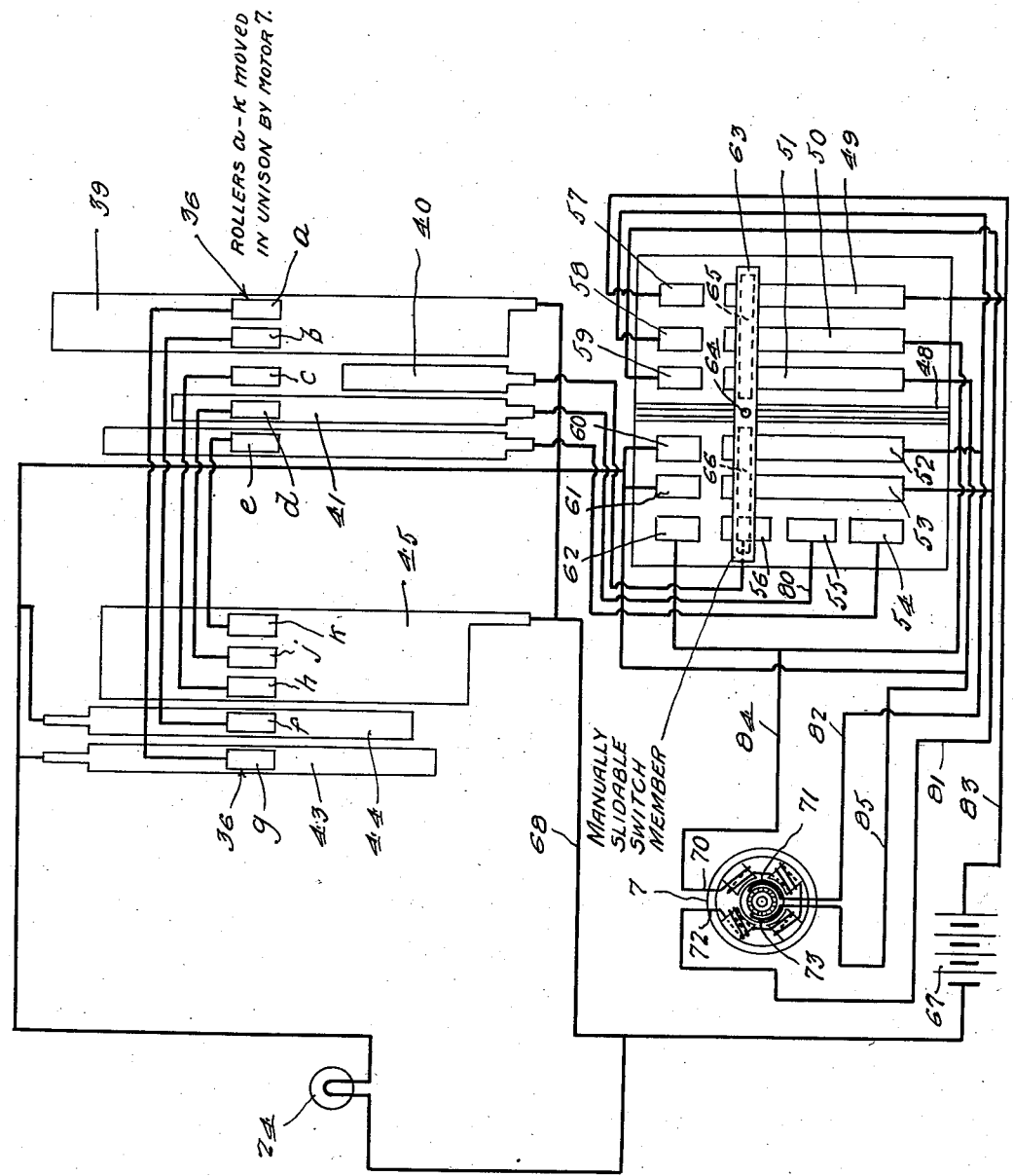

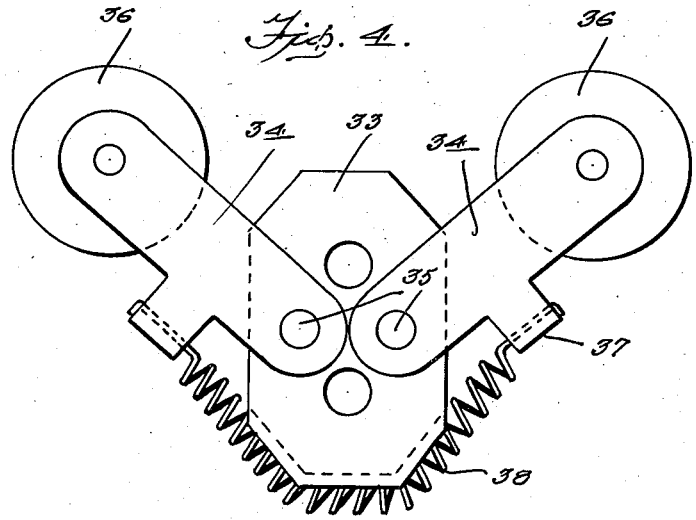
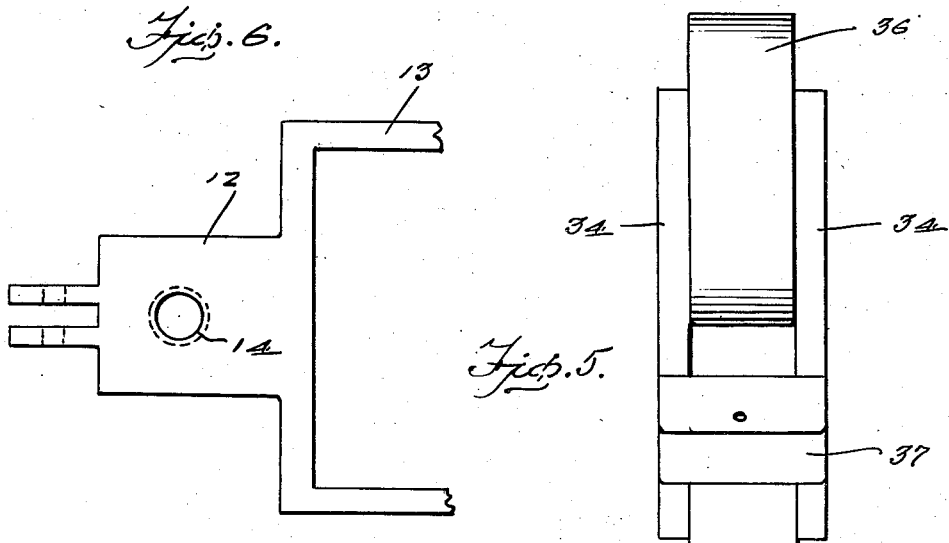
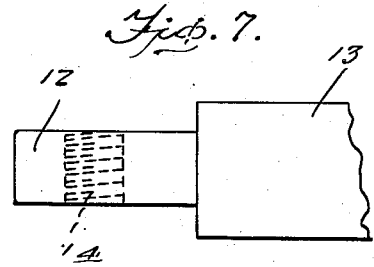

June 7, 1938.                R. HOLLAWAY                2,119,626
                              DIRECTION SIGNAL
                            Filed Dec. 19, 1933          6 Sheets-Sheet 5

Inventor
R. Hollaway
By Clarence A. O'Brien
Attorney

June 7, 1938. R. HOLLAWAY 2,119,626
DIRECTION SIGNAL
Filed Dec. 19, 1933 6 Sheets-Sheet 6
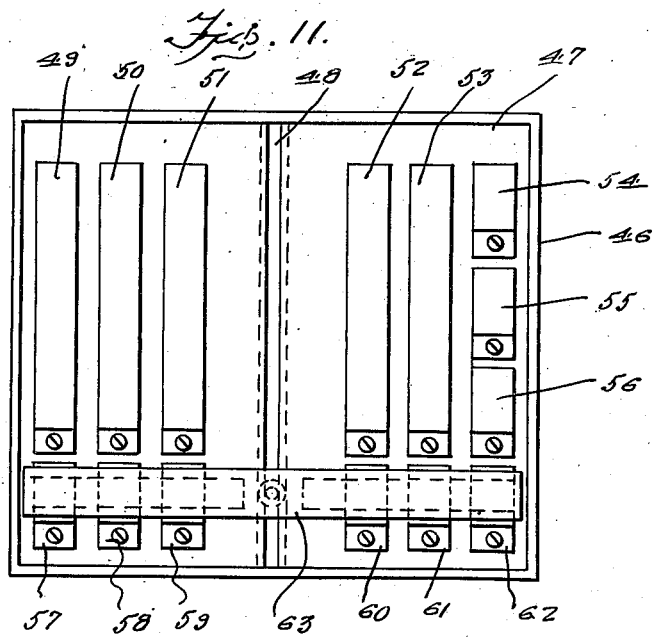
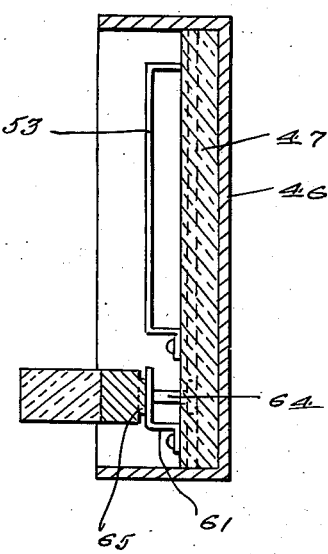
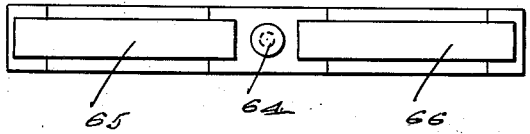
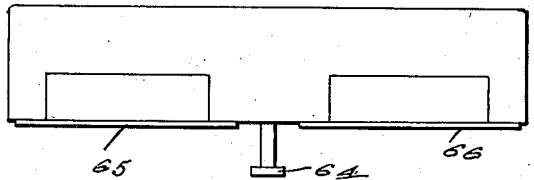
Inventor
R. Hollaway
By Clarence A. O'Brien
Attorney Patented June 7, 1938

2,119,626

UNITED STATES PATENT OFFICE 2,119,626

DIRECTION SIGNAL

Roy Hollaway, Alta Loma, Calif.

Application December 19, 1933, Serial No. 703,117

1 Claim. (Cl. 177—327)

This invention appertains to new and useful improvements in direction signals particularly adapted for use on automobiles.

The principal object of the present invention is to provide a direction signal for automobiles including a semaphore whereby the semaphore can be operated to different positions by the simple operation of a manual switch.

Another important object of the invention is to provide a semaphore type of signal which in operation will be positive acting and not susceptible to the development of ready defects.

These and various other important objects and advantages of the invention will become apparent to the reader of the following specification.

In the drawings:—

Figure 3 represents a diagrammatic view disclosing the electrical connections between the electrical devices involved.

Figure 4 represents a top plan view of the roller contact assembly.

Figure 5 represents a side elevational view of one of the roller units.

Figure 6 represents a fragmentary top plan view of the roller carrying yoke or elevator.

Figure 7 represents a fragmentary side elevational view of the elevator shown in Figure 6.

Figure 11 represents a front elevational view of the manual switch.

Figure 12 represents a vertical sectional view through the manual switch.

Figure 13 represents an inside elevational view of the contactor of the manual switch.

Figure 14 represents a top plan view of the contactor of the manual switch.

Figure 1:
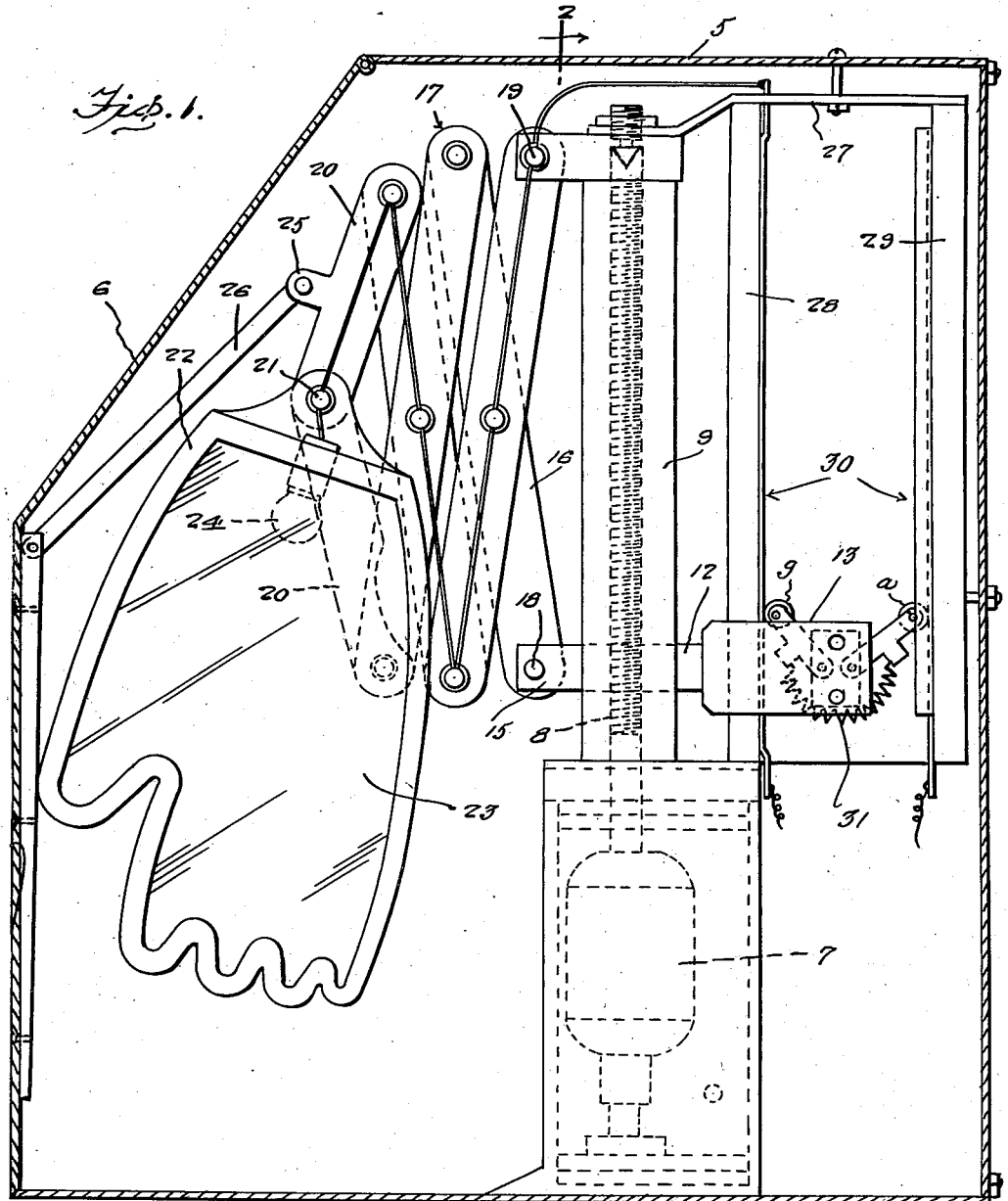
Figure 1 represents a vertical sectional view through the signal casing, showing the semaphore in side elevation.
Figure 2:
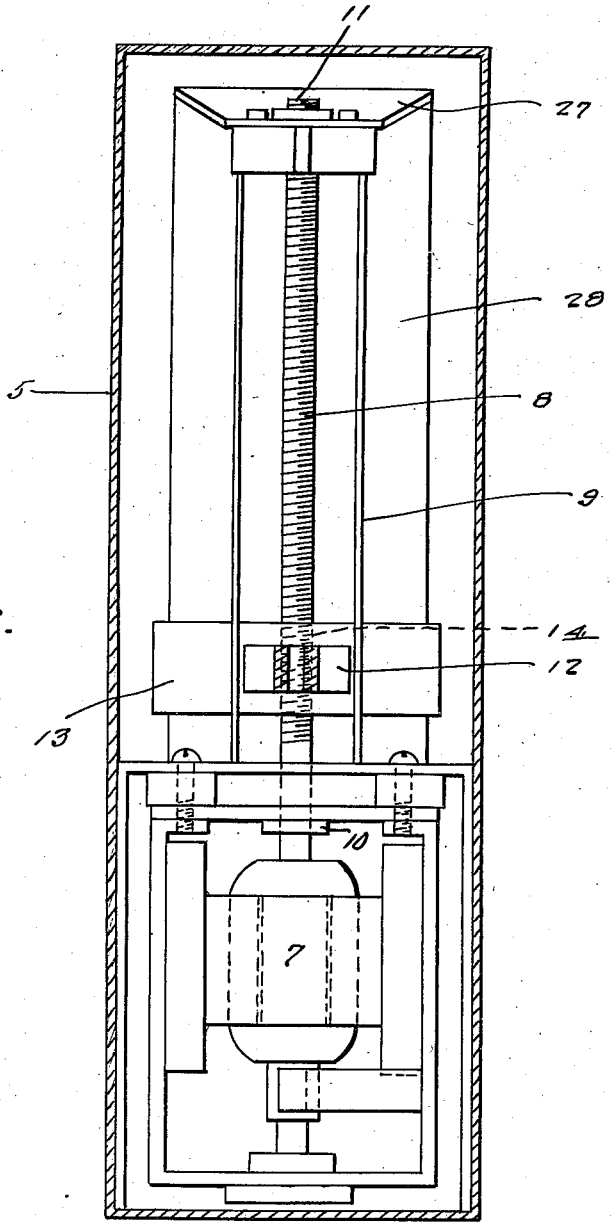
Figure 2 represents a vertical sectional view taken substantially on line 2—2 of Figure 1.
Figure 8:
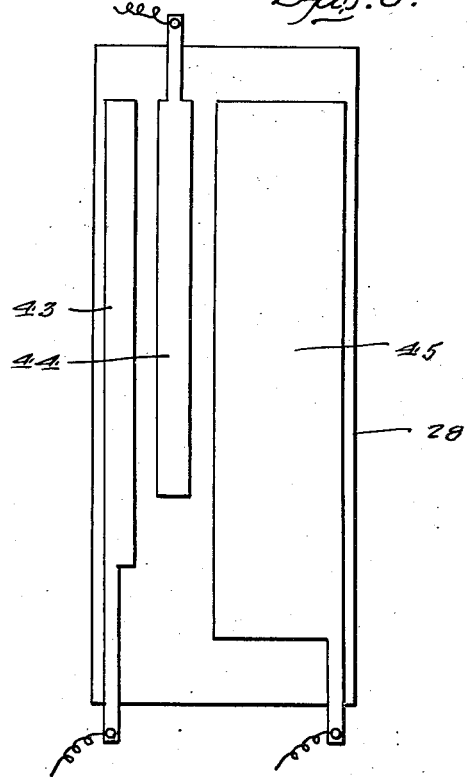
Figure 8 represents a face elevational view of one of the panels of the elevator switch.
Figure 9:
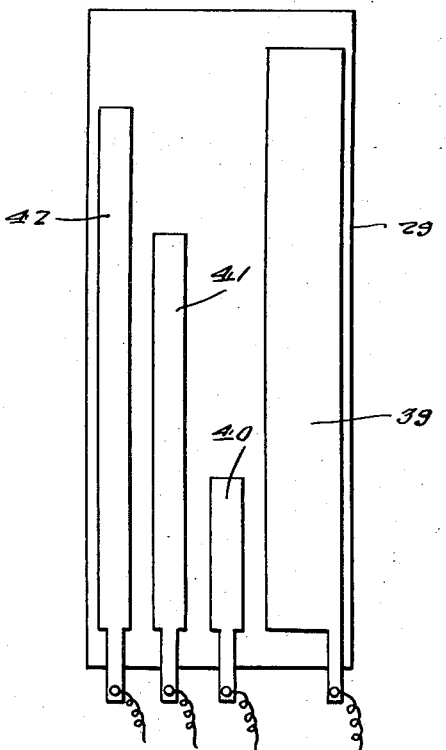
Figure 9 represents a face elevational view of the complementary contact panel of the elevator switch.

Referring to the drawings wherein like numerals designate like parts, it can be seen in Figure 1 that the signal proper consists of the casing 5 having a swingable closure 6 at its outer side.

Mounted in the casing 5 is the electric motor 7 which drives the vertical shaft 8. Numeral 9 represents a frame which supports bearing members 10 and 11 whereby the screw shaft is always maintained in proper vertical position, the upper bearing 11 being adjustable downwardly against the adjacent end of the screw shaft, as clearly shown in Figure 1.

Slidable within the frame 9 is the elevator block 12 from which projects the yoke 13. This elevator 12 is provided with a vertical threaded bore 14 through which the screw shaft 8 is threaded and obviously, when the shaft 8 rotates, the elevator block 12 will be raised or lowered. The block 12 has ears 15 between which an inner link 16 of the lazy tong arrangement 17 is pivotally connected, as at 18, while the complementary inner lazy tong link is pivotally connected at 19 to the upper portion of the frame 9. The two outermost link members 20 of the lazy tong 17 are connected, as as 21, to the lamp box 22 which is in the form of a hand semaphore having front and rear window panes 23 between which a lamp 24 is mounted. The upper forward end link 20 has an ear 25 thereon between which and the closure 6 a link 26 is disposed, so that when the semaphore hand 22 is thrown outwardly, the closure 6 will open in advance of the hand.

Numeral 27 represents a bridge piece extending from the top of the frame 9 and supporting the panels 28—29. These panels constitute separate contact supports of the elevator switch generally referred to by numeral 30. The panels 28—29 are of insulating material, disposed vertically and horizontally spaced from each other and between which the roller contact assembly generally referred to by numeral 31 is mounted. This assembly is mounted within the aforementioned yoke 13 and the same consists of pins 32 disposed through the legs of the yoke 13 and through the plates 33. On each of these plates 33 a pair of arms 34—34 are mounted by pivot elements 35—35 and each of these arms carries a roller 36. Each of the arms 34 is provided with a downwardly disposed lug 37 and these lugs are connected by a coiled spring 38 which passes under the corresponding plate 33 so as to tension the roller arms downwardly to engage the contact strips of the panels 28—29.

Figure 10:
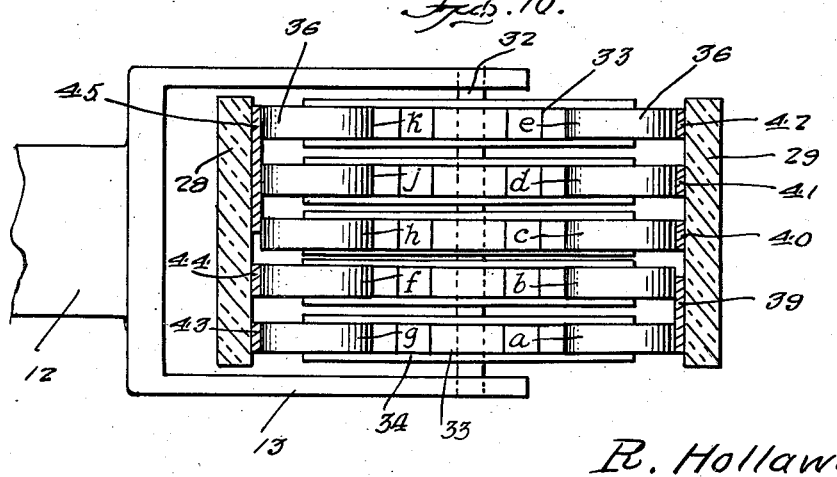
Figure 10 represents a horizontal sectional view through the elevator switch, showing the roller assembly in top elevation.

As is clearly shown in Figure 10, there are two sets of rollers of five rollers each, five rollers for each of the panels 28—29.

For the panel 29, the rollers $a$ and $b$ engage the single relatively broad contact strip 39, while the rollers $c$, $d$ and $e$ engage the single contact strips 40, 41 and 42, the contact strip 40 is the shortest of the strips, while the strip 41 is of intermediate length and the strip 42 the longest, corresponding to the positions of the semaphore "stop", "left signal" and "right signal".

The rollers for the panel 28 consist of the roller g engaging the single contact strip 43, the roller f engaging the strip 44 and the rollers h, j and k engaging the contact strip 45.

Referring to Figure 11, the manual switch, it can be seen that numeral 46 represents a casing within which the dielectric plate 47 is mounted and at an intermediate point a vertically extending guide slot 48 is provided in this dielectric plate. To one side of this groove 48 are the contact strips 49, 50 and 51, while to the other side of the groove 48 are the contact strips 52, 53 and the vertically spaced contacts 54, 55 and 56.

Below the contact strips 49, 50 and 51 are the elevator returning spring contacts 57, 58 and 59, respectively, while similar contacts are located beneath the contacts 52, 53 and 56 and these are denoted by numerals 60, 61 and 62 respectively. Numeral 63 represents the contactor handle which has a headed pin 64 for engaging into the guide groove 48. This switch handle 63 carries a pair of contact strips 65—66, the strip 65 engaging the contacts 57, 58 and 59 or the contacts 49, 50 and 51, while the strip 66 engages the contacts 60, 61 and 62, or the contacts 52, 53 and 56, or the contacts 52, 53 and 55, or contacts 52, 53 and 54.

By referring to Figure 3, it can be seen that numeral 67 represents the source of current which has its lead 68 extending to connect to the elevator switch contacts 39 and 45. A conductor 69 extends from the return contact strip to the contact 60 of the manual switch. From the contact 62 extends a wire to the right field 70 of the motor 7, while extending from the contact 61 is a wire to the right brush 71 of the motor 7. The contact 59 has a wire extending to the left field 72, while the contact 58 has a conductor extending to the left brush 73 and also to the upper contact strip 52 of the manual switch. It will also be observed that the wire from the contact 62 is continued to connect to the contact strip 50 of the manual switch.

The contact 57 has a wire to the negative side of the battery 67 and this wire also connects to the upper contact strip 49. The right field brush 71 has a wire connected to the upper contact strip 51 and as is clearly shown in Figure 3, the upper contact strip 53 is connected to the left field 72.

The contact 56 has a conductor extending to the stop signal contact strip 40 of the elevator switch, while the contact 55 has a conductor to the left signal contact strip. The contact 54 of the manual switch has a conductor leading to the right signal contact strip 42 of the elevator switch, all as is clearly shown in Figure 3.

To cause the signal to move to "stop" position, the contactor 65 is moved to connect plates 52, 53, and 56 on one side and plates 49, 50, and 51 on the other side. Current from the battery to plate 45 is conducted to plate 40 by means of the roller assembly 13 and from there to plate 52 which in turn directs current from plate 56 to the left brush 73 of the motor as shown in Figure 3. On the negative side of the switch plate 49, namely the contact 57, is connected to the negative side of the battery. The switch contactor 65 also connects plates 50 and 51. The plate 50 is connected to the right field of the motor, denoted by numeral 70, while the plate 51 is connected to the right brush 71, all as shown in Figure 3. When the roller assembly 13 moves off of plate 40, this breaks all connections, thereby causing signal elements to stop.

The switch is connected up with a source of current and when operated to give a "left turn" indication, current will flow from the source by way of the switch. Current flows on the plate 45 to the relay plate 41 by way of rollers j—d. Current then flows to the switch plate 63 by way of the conductor 80. The current passes from the switch plate 53 to the field 72 and current will flow on the conductor 81 from there to the switch plate 52. The conductor 82 carries current to the brush 71. It will be observed that the right panel of the switch as shown in the diagram is the negative side while the opposite panel represents the positive side of the switch with respect to the source of current. As shown in the diagrammatic view, the wire 83 is connected to the switch plate 49 while the plate 50 is connected to the field 70 by the wire 84 and the plate 51 is in turn connected to the brush 73 by the conductor 85. In the operation of the switch to accomplish the purpose stated the plates 49, 50 and 51 are connected by the switch lever 63 to complete the return side of the motor thereby causing the motor to rotate, raising the hand 22 to a left turn position and causing the roll assembly to run off of the plate 41, breaking the connection when the hand has been sufficiently lifted.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A direction signal comprising a semaphore, an illuminating element for the semaphore, a lazytong structure, means for securing the lazytong structure to the semaphore, a switch including a pair of spaced and opposed panels of insulating material, conductor strips disposed on the opposite sides of the panels and secured thereto, a contactor movable between said plates and in riding engagement with said strips, a block extending from the contactor and provided with a threaded bore, a motor, a screw shaft connected to and driven by the motor and threadedly disposed through the bore of the block for feeding said block and contactor, a support for one end of the shaft, said lazytong structure having one of its link members connected to the said block, a source of current connected to the strips on one of the panels, said illuminating element and motor being connected to the strips on the opposed panel.

ROY HOLLAWAY.